US010356717B2

(12) United States Patent
Trainin

(10) Patent No.: US 10,356,717 B2
(45) Date of Patent: Jul. 16, 2019

(54) APPARATUS, SYSTEM AND METHOD OF POWER MANAGEMENT IN A WIRELESS NETWORK

(71) Applicant: INTEL IP CORPORATION, Santa Clara, CA (US)

(72) Inventor: Solomon B. Trainin, Haifa (IL)

(73) Assignee: INTEL IP CORPORATION, Santa Clara, CA (US)

( * ) Notice: Subject to any disclaimer, the term of this patent is extended or adjusted under 35 U.S.C. 154(b) by 79 days.

(21) Appl. No.: 15/537,984

(22) PCT Filed: Jun. 24, 2015

(86) PCT No.: PCT/US2015/037338
§ 371 (c)(1),
(2) Date: Jun. 20, 2017

(87) PCT Pub. No.: WO2016/118184
PCT Pub. Date: Jul. 28, 2016

(65) Prior Publication Data
US 2017/0353925 A1 Dec. 7, 2017

Related U.S. Application Data

(60) Provisional application No. 62/105,282, filed on Jan. 20, 2015.

(51) Int. Cl.
*G08C 17/00* (2006.01)
*H04W 52/02* (2009.01)
(Continued)

(52) U.S. Cl.
CPC ... *H04W 52/0216* (2013.01); *H04W 52/0248* (2013.01); *H04W 84/12* (2013.01);
(Continued)

(58) Field of Classification Search
CPC ......... H04W 52/0216; H04W 52/0248; H04W 84/12; H04W 88/06; Y02D 70/1264;
(Continued)

(56) References Cited

U.S. PATENT DOCUMENTS 8,451,761 B2 * 5/2013 Seok ................. H04W 52/0235
370/311
8,611,268 B1 * 12/2013 Thandaveswaran ........................
H04W 52/0206
370/311

(Continued)

FOREIGN PATENT DOCUMENTS

RU 2499368 11/2013
WO 2014071308 5/2014

OTHER PUBLICATIONS

International Search Report and Written Opinion for PCT/US2015/037338, dated Oct. 20, 2015, 9 pages.
(Continued)

*Primary Examiner* — Stephen M D Agosta
(74) *Attorney, Agent, or Firm* — Shichrur & Co.

(57) ABSTRACT

Some demonstrative embodiments include apparatuses, devices, systems and methods of power management in a wireless network. For example, a wireless station may be configured to transmit a first frame including a first Wakeup Schedule Element (WSE), the first WSE including a first beacon interval (BI) start time field value; to switch to a Power Save (PS) mode based on the first BI start time field value; and during the PS, transmit a second frame including a second WSE, the second WSE including a second BI start time field value, e.g., different from the first BI start time field value.

21 Claims, 5 Drawing Sheets

(51) Int. Cl.
*H04W 88/06* (2009.01)
*H04W 84/12* (2009.01)

(52) U.S. Cl.
CPC ............. *H04W 88/06* (2013.01); *Y02D 70/00*
(2018.01); *Y02D 70/1224* (2018.01); *Y02D*
*70/1262* (2018.01); *Y02D 70/1264* (2018.01);
*Y02D 70/142* (2018.01); *Y02D 70/144*
(2018.01); *Y02D 70/146* (2018.01); *Y02D*
*70/162* (2018.01); *Y02D 70/164* (2018.01);
*Y02D 70/166* (2018.01); *Y02D 70/168*
(2018.01); *Y02D 70/22* (2018.01); *Y02D 70/26*
(2018.01)

(58) Field of Classification Search
CPC ............. Y02D 70/168; Y02D 70/1224; Y02D
70/142; Y02D 70/22; Y02D 70/00
See application file for complete search history.

(56) References Cited

U.S. PATENT DOCUMENTS

| | | | | |
|---|---|---|---|---|
| 8,767,771 | B1* | 7/2014 | Shukla | H04W 52/0216 370/468 |
| 8,797,930 | B2* | 8/2014 | Wentink | H04W 52/0235 370/311 |
| 9,319,850 | B2* | 4/2016 | Lin | H04W 4/10 |
| 9,706,492 | B2* | 7/2017 | Chu | H04W 52/0216 |
| 2006/0285527 | A1 | 12/2006 | Gao et al. | |
| 2008/0056133 | A1* | 3/2008 | Deshpande | H04W 52/0216 370/235 |
| 2010/0165896 | A1* | 7/2010 | Gong | H04W 52/0216 370/311 |
| 2010/0315983 | A1 | 12/2010 | Choi et al. | |
| 2011/0199952 | A1 | 8/2011 | Seok | |
| 2011/0286375 | A1 | 11/2011 | Chu et al. | |
| 2013/0034004 | A1 | 2/2013 | Mannemala et al. | |
| 2013/0044739 | A1* | 2/2013 | Huang | H04W 52/0216 370/338 |
| 2013/0329576 | A1* | 12/2013 | Sinha | H04W 52/0229 370/252 |
| 2014/0071870 | A1* | 3/2014 | Abraham | H04W 52/0206 370/311 |
| 2014/0086129 | A1 | 3/2014 | Gong et al. | |
| 2014/0233443 | A1* | 8/2014 | Kumar | H04L 12/12 370/311 |

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.
Wigig Wireless Gigabit Alliance, Wigig MAC and PHY Specification Version 1.1, Apr. 2011, 442 pages.
European Search Report for European Patent Application No. 15879208.5, dated Aug. 6, 2018, 9 pages.
Carlos Cordeiro (Intel): "CP-specification ; 11-10-0433-02-00ad-cp-specification", IEEE Draft; 11-10-0433-02-00AD-CP-Specification, IEEE-SA Mentor, Piscataway, NJ USA, vol. 802.11 ad, No. 2, May 17, 2010 (May 17, 2010), pp. 1-336, XP017677169, 336 pages.
Office Action for Russian Patent Application No. 2017121589, dated Feb. 1, 2018, 9 pages. (Including 2 pages of English translation).
International Preliminary Report on Patentability for PCT /US2015/037338, dated Aug. 3, 2017, 6 pages.
Office Action for European Patent Application No. 15879208.5, dated Mar. 20, 2019, 4 pages.
Office Action for Japanese Patent Application No. 2017-534682, dated Mar. 12, 2019, 5 pages (Including 2 pages of English translation).
Payam Torab (Broadcom), 11-12-0048-01-00ad-Wakeup-Schedule-Element, IEEE 802.11-12/0048r1, IEEE, <URL: https://mentor.ieee.org/802.11/dcn/12/11-1 2-0048-01-00ad-wakeup-schedule-element.docx>, Jan. 12, 2012, pp. 1-4, 5 pages.

\* cited by examiner

APPARATUS, SYSTEM AND METHOD OF POWER MANAGEMENT IN A WIRELESS NETWORK

CROSS REFERENCE

This application claims the benefit of and priority from U.S. Provisional Patent Application No. 62/105,282 entitled "Apparatus, System and Method of Power Management in a Wireless Network", filed Jan. 20, 2015, the entire disclosure of which is incorporated herein by reference.

TECHNICAL FIELD

Embodiments described herein generally relate to power management in a wireless network.

BACKGROUND

A personal basic service set (PBSS) control point (PCP) may operate in a wireless communication network over a millimeter-wave band, e.g., a Directional-Multi-Gigabyte (DMG) network.

The PCP may utilize a power management mechanism, for example, according to IEEE 802.11ad-2012 ("*IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band*", 28 December, 2012).

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
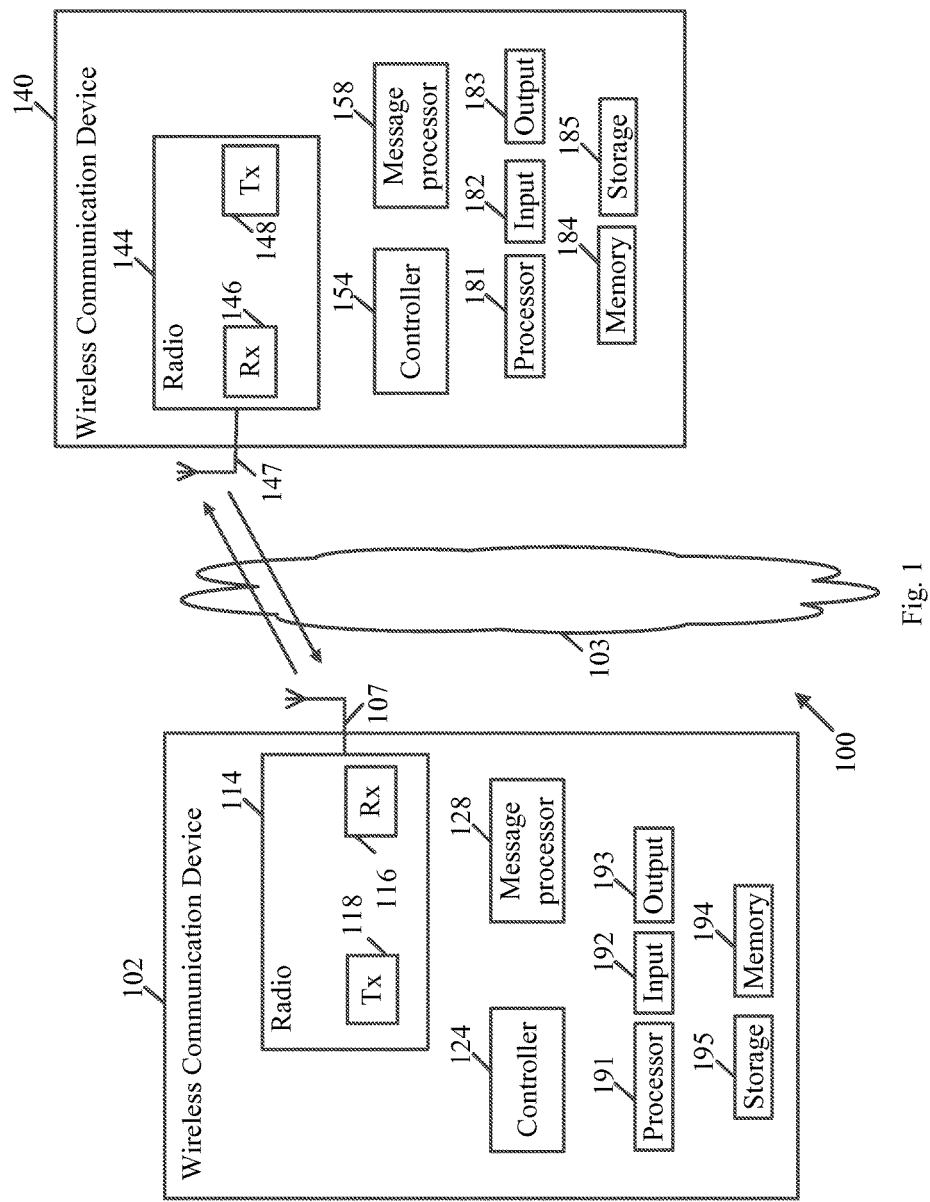
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, an Internet of Things (IoT) device, a sensor device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.1, April 2011, Final specification) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012; *IEEE802.11ac-2013 ("IEEE P802.11ac-2013, IEEE Standard for Information Technol-* ogy—*Telecommunications and Information Exchange Between Systems—Local and Metropolitan Area Networks—Specific Requirements—Part* 11: *Wireless LAN Medium Access Control (MAC) and Physical Layer (PHY) Specifications—Amendment* 4: *Enhancements for Very High Throughput for Operation in Bands below 6 GHz*", December, 2013); IEEE 802.11ad (*"IEEE P802.11ad-2012, IEEE Standard for Information Technology—Telecommunications and Information Exchange Between Systems—Local and Metropolitan Area Networks—Specific Requirements—Part* 11: *Wireless LAN Medium Access Control (MAC) and Physical Layer (PHY) Specifications—Amendment* 3: *Enhancements for Very High Throughput in the* 60 *GHz Band*", 28 December, 2012); IEEE-802.11REVmc (*"IEEE 802.11-REVmc™/D3.0, June* 2014 *draft standard for Information technology—Telecommunications and information exchange between systems Local and metropolitan area networks Specific requirements; Part* 11: *Wireless LAN Medium Access Control (MAC) and Physical Layer (PHY) Specification*"); IEEE802.11-ay (*P802.11ay Standard for Information Technology—Telecommunications and Information Exchange Between Systems Local and Metropolitan Area Networks—Specific Requirements Part* 11: *Wireless LAN Medium Access Control (MAC) and Physical Layer (PHY) Specifications—Amendment: Enhanced Throughput for Operation in License-Exempt Bands Above* 45 *GHz*)) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version* 1.5, Aug. 4, 2015) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a frequency band above 45 GHZ, a frequency band below 20 GHZ, e.g., a Sub 1 GHZ (S1G) band, a 2.4 GHz band, a 5 GHZ band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., 7 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a first wireless communication device 102, and/or a second wireless communication device 140.

In some demonstrative embodiments, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a wearable device, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 includes, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, an RF channel, a Wireless Fidelity (WiFi) channel, an IR channel, a Bluetooth (BT) channel, a Global Navigation Satellite System (GNSS) Channel, and the like.

In some demonstrative embodiments, WM 103 may include a directional channel. For example, WM 103 may include a millimeter-wave (mmWave) wireless communication channel.

In some demonstrative embodiments, WM 103 may include a DMG channel. In other embodiments, WM 103 may include any other additional or alternative directional channel.

In other embodiments, WM 103 may include any other type of channel over any other frequency band.

In some demonstrative embodiments, devices 102 and/or 140 may perform the functionality of one or more wireless stations, e.g., as described below.

In some demonstrative embodiments, devices 102 and/or 140 may perform the functionality of one or more DMG stations.

In other embodiments, devices 102 and/or 140 may perform the functionality of any other wireless device and/or station, e.g., a WLAN STA, a WiFi STA, and the like.

In some demonstrative embodiments, devices 102 and/or 140 may include one or more radios including circuitry and/or logic to perform wireless communication between devices 102, 140 and/or one or more other wireless communication devices. For example, device 102 may include a radio 114, and/or device 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114 and/or 144 may include one or more wireless transmitters (Tx) including circuitry and/or logic to send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114 and/or 144 may include circuitry, logic, modulation elements, demodulation elements, amplifiers, analog to digital and digital to analog converters, filters, and/or the like. For example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include a directional antenna, which may be steered to a plurality of beam directions.

In some demonstrative embodiments, device 102 may include a controller 124, and/or device 140 may include a controller 154. Controllers 124 and/or 154 may be configured to perform one or more communications, may generate and/or communicate one or more messages and/or transmissions, and/or may perform one or more functionalities, operations and/or procedures, for example, at devices 102 and/or 140, and/or between devices 102 and/or 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below. In one example, message processor 128 may be configured to process transmission of one or more messages from a wireless station, e.g., a wireless STA implemented by device 102; and/or message processor 128 may be configured to process reception of one or more messages by a wireless station, e.g., a wireless STA implemented by device 102.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below. In one example, message processor 158 may be configured to process transmission of one or more messages from a wireless station, e.g., a wireless STA implemented by device 140; and/or message processor 158 may be configured to process reception of one or more messages by a wireless station, e.g., a wireless STA implemented by device 140.

In some demonstrative embodiments, message processors 128 and/or 158 may include circuitry, e.g., processor circuitry, memory circuitry, Media-Access Control (MAC) circuitry, Physical Layer (PHY) circuitry, and/or any other circuitry, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 104.

In some demonstrative embodiments, at least part of the functionality of controller 124 and/or message processor 128 may be implemented by an integrated circuit, for example, a chip, e.g., a System in Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a SoC. In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, devices 102 and/or 140 may be configured to perform the functionality of at least one wireless station (STA).

In some demonstrative embodiments, devices 102 and/or 140 may be configured to perform the functionality of an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, devices 102 and/or 140 may be configured to perform the functionality of a non-AP STA, e.g., a DMG non-AP STA, and/or a non-PCP STA, e.g., a DMG non-PCP STA, for example, a non-AP/PCP STA, e.g., a DMG non-AP/PCP STA.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments, system 100 may include a PCP/AP STA and one or more non-PCP/non-AP STAs. For example, device 102 may perform the functionality of a PCP/AP STA, e.g., a PCP, and/or device 140 may perform the functionality of a non-PCP/AP STA. In another example, device 140 may perform the functionality of a PCP/AP STA, e.g., a PCP, and/or device 120 may perform the functionality of a non-PCP/AP STA.

In some demonstrative embodiments, system 100 may include two or more non-PCP/AP STAs. For example, device 102 may perform the functionality of a first non-PCP/AP STA, and/or device 140 may perform the functionality of a second non-PCP/AP STA.

In other embodiments, system 100 may include any other combination of wireless stations of one or more additional or alternative types.

Some demonstrative embodiments may be implemented to perform power management of one or more stations, e.g., in a DMG network. In one example, some demonstrative embodiments may be implemented to enable power saving at a STA, for example, a PCP/AP STA and/or a non-PCP/AP STA.

In some demonstrative embodiments, a STA, e.g., a STA implemented by device 102 and/or a STA implemented by device 140, may be configured to operate at an active mode or state, for example, in which increased, e.g., full, functionality may be provided, and a power save (PS) mode or state, in which reduced, for example, limited, e.g., very limited, functionality may be provided.

For example, when at the power save mode, a STA may operate at a sleep mode, a reduced-power mode, a stand-by mode and/or any other operation mode which consumes less power than required for operation of the STA at the active mode, for example, for reception, handling, decoding and/or processing wireless communication signals.

In some demonstrative embodiments, the STA, e.g., the STA implemented by device 102 and/or the STA implemented by device 140, may advertise the PS mode of the STA, for example, by including a wakeup schedule element (WSE), for example, a DMG WSE, e.g., in one or more frames transmitted by the STA.

In some demonstrative embodiments, the STA may perform the functionality of a PCP STA. According to these embodiments, the STA may include the WSE in one or more beacons and/or Announce frames transmitted by the PCP, e.g., one or more DMG beacons and/or DMG Announce frames.

In one example, device 102 may perform the functionality of a PCP STA. According to this example, device 102 may transmit one or more beacons, e.g., DMG beacons, including a WSE, e.g., to indicate one or more parameters corresponding to a PCP PS (PPS) mode of the PCP STA, e.g., as described below.

In some demonstrative embodiments, the STA may perform the functionality of a non-PCP STA. According to these embodiments, the STA may include the WSE in one or more frames transmitted from the STA.

For example, the non-PCP STA may include the WSE in one or more frames transmitted to a PCP STA.

In one example, the non-PCP STA my include the WSE element, for example, in a Power Save Configuration frame, e.g., a Power Save Configuration Request frame, to be transmitted to the PCP STA, and/or any other frame.

In one example, device 102 may perform the functionality of a non-PCP STA. According to this example, device 102 may transmit one or more frames, e.g., DMG Power Save Configuration Request frames, including a WSE, e.g., to indicate one or more parameters corresponding to a PS mode of the non-PCP STA, e.g., as described below.

In some demonstrative embodiments, the WSE may include a Beacon Interval (BI) Start time field, a Sleep Cycle field, and a Number of Awake/Doze BIs field, e.g., as described below.

In other embodiments, the WSE may include any other additional or alternative fields and/or subfields.

In some demonstrative embodiments, the BI start time field may include a BI start time field value ("BI start time field value"), e.g., as described below.

In some demonstrative embodiments, the BI start time field may have a size ("the Beacon Interval Start time range") of 4 octets, e.g., including 32 bits. In other embodiments, the BI start time field may have any other size, for example, including less than 32 bits, e.g., 16 bits, or including more than 32 bits, e.g., 64 bits, or any other number of bits.

In some demonstrative embodiments, a STA, e.g., a STA implemented by device 102 and/or a STA implemented by device 140, may be configured to set the beacon interval start time value in a WSE to represent a time at which the STA may move to the power save mode, e.g., as described below.

In some demonstrative embodiments, the Sleep Cycle field may represent a mode of beacon intervals (BI) during the power save mode. For example, the STA may switch between awake BIs (awake BI mode) and doze BIs (doze BI mode), e.g., when operating in the power save mode, e.g., as described below.

In some demonstrative embodiments, a STA generating the WSE ("the WSE originator STA"), e.g., the STA implemented by device 102, may be configured to perform different functionalities and/or provide different services, for example, depending on the BI mode.

In some demonstrative embodiments, a station, e.g., any station, for example, a STA implemented by device 140, which processes a received WSE ("the WSE receiver STA"), may be able to identify the mode of BI the WSE originator STA is operating, and to behave accordingly.

In some demonstrative embodiments, the WSE receiver STA may identify the mode of the BI, for example, based on information including a timestamp, e.g., a 64 bit field, of a frame including the WSE, and/or one or more of the fields of the WSE.

In some demonstrative embodiments, the WSE may be generated and transmitted by a PCP STA, e.g., a PCP STA implemented by device 102. For example, the PCP STA may be configured to operate at an active mode, for example, in which increased, e.g., full, functionality may be provided, and a PCP power save (PPS) mode, in which reduced, e.g., very limited, functionality may be provided.

In some demonstrative embodiments, the PCP STA may advertise the PPS mode, for example, by including a WSE, e.g., in a DMG beacon.

In some demonstrative embodiments, the PCP STA may set the Beacon interval Start time field to include a Beacon interval Start Time value, which may be configured, for example, to indicate the lower order 4 octets of a Timing Synchronization Function (TSF) timer. For example, the PCP STA may set the BI start time value to represent a time at which the PCP STA may move to the power save mode.

In some demonstrative embodiments, the Sleep Cycle field may represent a mode of BIs during the power save mode. For example, the PCP STA may switch between awake BIs (awake BI mode) and doze BIs (doze BI mode), e.g., when operating in the PPS mode. The PCP STA may provide different services, for example, depending on the BI mode.

In some demonstrative embodiments, a station, e.g., any station, for example, a STA implemented by device 140, which processes the WSE from the DMG beacon from the PCP STA, may be able to identify the mode of BI the PCP STA is operating, and to behave accordingly.

In some demonstrative embodiments, the station may identify the mode of the BI, for example, based on information including a timestamp, e.g., a 64 bit field, of the DMG beacon, and/or one or more of the fields of the WSE delivered by the DMG beacon from the PCP STA.

In some demonstrative embodiments, the duration of time that the WSE originator STA, e.g., the STA implemented by device 102, may stay in the PS mode may be limited, for example, if the WSE is not updated, e.g., as described below.

In some demonstrative embodiments, the duration of time that a PCP STA transmitting a WSE, e.g., the PCP STA implemented by device 102, may stay in the PPS mode may be limited, for example, if the WSE is not updated.

In some demonstrative embodiments, the duration of time that the STA generating the WSE may stay in the PS mode may be limited, for example, to half of a range of the BI start time field, for example, if the BI start time field is not updated, e.g., as described below.

In some demonstrative embodiments, the BI start time range may be, for example, 32 bits, for example, if the BI start time field includes 4 octets.

In some demonstrative embodiments, the duration of time that the WSE originator STA may stay in the PS mode may be limited, for example, to no longer than $2^{31}-1$ microseconds, for example, if the BI start time field includes 4 octets, and for example, if the BI start time field is not updated, e.g., as described below.

Figure 2:
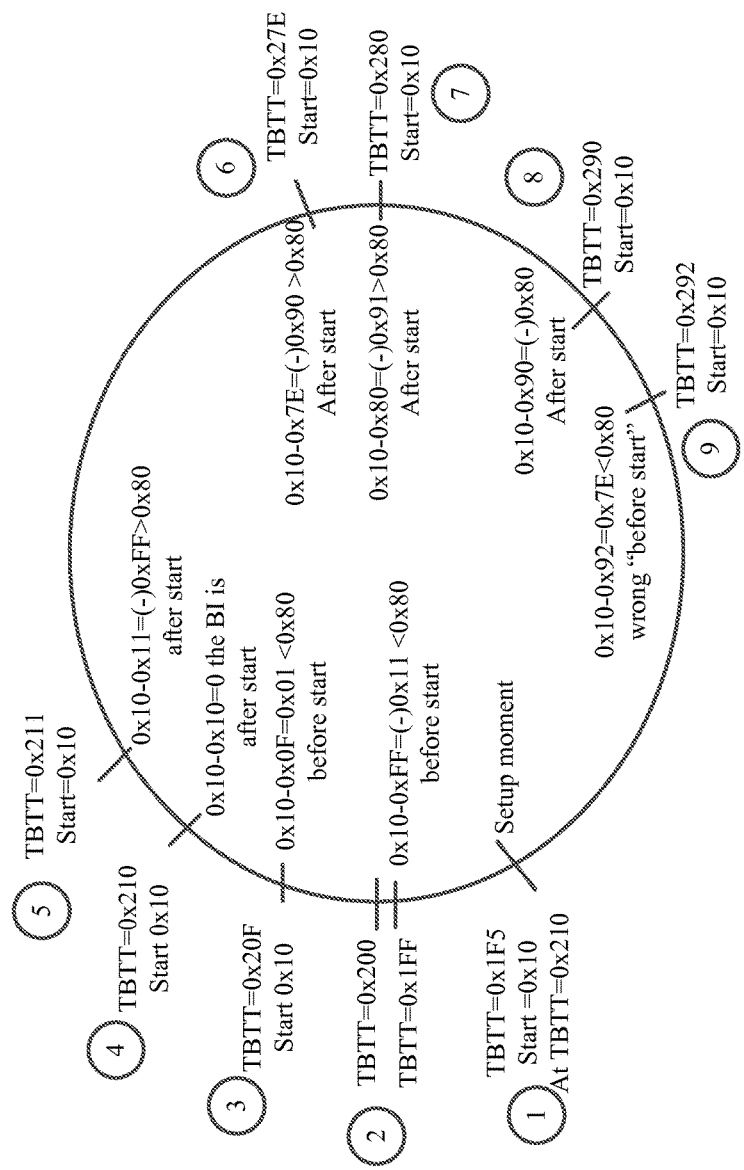
FIG. 2 is a schematic illustration of indications of a power save mode of a wireless station (STA) when a Beacon Interval (BI) Start Time field is not updated, in accordance with some demonstrative embodiments.

Reference is made to FIG. 2, which illustrates indications of a power save mode of a STA when a BI start time field is not updated, in accordance with some demonstrative embodiments.

For simplicity, the following description with respect to FIG. 2 relates to a BI start time field having a BI start time range of 16 bits. This value is being used for illustrative purposes. However, the BI start time field may have, for example, a range of 32 bits, e.g., as described above, and/or any other wider or narrower range.

As shown in FIG. 2, a STA may insert a WSE in a frame, for example, beacon or a Power Save Configuration Request frame, e.g., at a first time point denoted "1". As shown in FIG. 2, the WSE may include a BI start Time field set to (0x10) in Hexadecimal form.

As shown in FIG. 2, a difference, e.g., an absolute value of the difference, between the value in the BI start time field value (0x10) in Hexadecimal form, and the low 16 bits of a Target Beacon Transmission Time (TBTT) may be compared to half of the beacon start time range, for example, $2^8$, e.g., (0x80) in Hexadecimal form.

As shown in FIG. 2, the difference, e.g., the absolute difference, between the value in the BI start time field value (0x10) in Hexadecimal form, and the low 16 bits of the TBTT at a second time point, denoted "2", and a third time point, denoted "3", may indicate that the STA is in the active mode, e.g., since the difference between the BI start time field value (0x10) in Hexadecimal form, and the low 16 bits of the TBTT at time points 2 and 3 is less than half of BI start time range.

As shown in FIG. 2, in a beacon interval (BI) that follows TBTT=210 in Hexadecimal form, at a time point, denoted "4", the difference, e.g., the absolute difference, between the BI start time field value (0x10) in Hexadecimal form, and the low 16 bits of the TBTT at time point 4, may indicate that the STA is just beginning the PS mode, e.g., since the difference between the BI start time field value (0x10) in Hexadecimal form, and the low 16 bits of the TBTT at time point 4 is equal to half of the BI start time range.

As shown in FIG. 2, the difference, e.g., the absolute difference, between the BI start time field value (0x10) in Hexadecimal form, and the low 16 bits of the TBTT at subsequent time points, denoted "5", "6", "7", and "8", may correctly indicate that the STA is in the PS mode, e.g., since the difference between the BI start time field value (0x10) in Hexadecimal form, and the low 16 bits of the TBTT at time points 5, 6, 7 and 8 is equal to or greater than half of the BI start time range.

However, as shown in FIG. 2, the absolute difference between the BI start time field value (0x10) in Hexadecimal form, and the low 16 bits of the TBTT at a time point, denoted "9", may erroneously indicate that the STA is in the active mode "before start", while the STA may actually select to be in the PS mode at time point 9.

Accordingly, in order to eliminate wrong identification of the PS mode of the STA by another STA, the STA may not be allowed to stay in the PS mode longer than a time, which is, for example, equal to a TBTT, at which the WSE is issued, plus $(2^{31}-1)$, minus the BI Start time, e.g., if the BI start time field has a range of 32 bits. Therefore, a maximal duration the STA may be allowed to stay in the PS mode may not be longer than $2^{31}-1$ microseconds, for example, if the BI start time field has a range of 32 bits.

Referring back to FIG. 1, in some demonstrative embodiments, a STA, e.g., a STA implemented by device 102 and/or a STA implemented by device 140, may be configured to be able to select to stay in the PS mode for a time duration, which may, for example, be even longer than the time period corresponding to half of the range of the BI start time field, e.g., as described below.

In some demonstrative embodiments, a STA, e.g., a STA implemented by device 102 and/or a STA implemented by device 140, may be configured to be able to select to stay in the PS mode for a time duration, which may be, for example, even longer than $2^{31}-1$ microseconds, for example, if the BI start time field has a range of 32 bits, e.g., as described below.

In some demonstrative embodiments, a STA, e.g., a STA implemented by device 102 and/or a STA implemented by device 140, may be configured to replace or update an actual BI start time value of a sleep cycle, e.g., as announced by the WSE.

In some demonstrative embodiments, a STA, e.g., a STA implemented by device 102 and/or a STA implemented by device 140, may be configured to replace or update the BI start time field value of the sleep cycle by a new or updated value, which may be configured to indicate the STA is to be in the PS mode, for example, even after a time period having a duration corresponding to half of the full range of the BI start time field, e.g., as described below.

In some demonstrative embodiments, a STA, e.g., a STA implemented by device 102 and/or a STA implemented by device 140, may be configured to replace or update the BI start time field value of the sleep cycle, for example, at a time, which is, for example, within the sleep cycle, e.g., as described below.

In some demonstrative embodiments, when operating at the PS mode, a STA, e.g., a STA implemented by device 102 and/or a STA implemented by device 140, may be configured to update the BI start time field value of the sleep cycle, for example, at a time, which is, for example, less than half of the full range of the BI start time field plus an actual BI start time of the sleep cycle, e.g., as described below.

In some demonstrative embodiments, a STA, e.g., a STA implemented by device 102 and/or a STA implemented by device 140, may be configured to extend the PS mode by updating the BI start time field value of the sleep cycle to a new value, which may be based, for example, on a TBTT, e.g., the lower 32 bits of the TBTT, of a BI, e.g., a BI at a start time of a sleep cycle, e.g., as described below.

In some demonstrative embodiments, a STA, e.g., a STA implemented by device 102 and/or a STA implemented by device 140, may be configured to extend the PS mode by updating the BI start time field value to a value, which is based on four lower octets of the TBTT of the BI at the start time of the sleep cycle.

In some demonstrative embodiments, a STA, e.g., a STA implemented by device 102 and/or a STA implemented by device 140, may be configured to extend the PS mode by updating the BI start time field value to a value, which is based on four lower octets of the TBTT of the BI at the start time of a current sleep cycle.

In some demonstrative embodiments, a STA, e.g., a STA implemented by device 102 and/or a STA implemented by device 140, may be configured to repeatedly extend the duration of the PS mode, for example, by repeating the replacing of the BI start time field value of the sleep cycle by the new and/or updated BI start time value, for example, for one or more times.

In some demonstrative embodiments, enabling a STA, e.g., a STA implemented by device 102 and/or a STA implemented by device 140, to extend the duration of the PS mode may enable the STA to extend the PS mode, for example, for a long time, e.g., even for an unlimited time.

In some demonstrative embodiments, enabling a STA, e.g., a STA implemented by device 102 and/or a STA implemented by device 140, to extend the duration of the PS mode may, for example, improve a user experience, for example, by maintaining low power at the STA, for example, to extend a battery life of the STA, e.g., while providing increased responsiveness.

In some demonstrative embodiments, controller 124 may be configured to cause a wireless station implemented by device 102 to perform the functionality of a STA, e.g., a PCP/AP STA or a non-PCP/AP STA; and to generate and transmit one or more frames including a WSE, for example, to indicate a PS mode of the STA.

In some demonstrative embodiments, radio 144 may receive one or more frame including the WSE indicating the PS mode of device 102. Controller 154 may process the WSE, and may perform one or more operations according to the contents of the WSE. For example, controller 154 may control communications by device 140 according to the PS mode of device 102, as indicated by the WSE.

In some demonstrative embodiments, controller 124 may be configured to cause the wireless station implemented by device 102 to transmit a first frame including a first WSE, the first WSE including a first BI start time field value, e.g., in a BI start time field.

In some demonstrative embodiments, controller 124 may be configured to cause the wireless station implemented by device 102 to transmit the first frame, for example, prior to the first wireless station transitioning to a PS mode.

In some demonstrative embodiments, the first BI start time field value may include a value configured to indicate a start time, in which the wireless station is to transition to the PS mode.

In some demonstrative embodiments, the first BI start time field value may be based, for example, on a Target Beacon Transmission Time (TBTT) of a BI, during which the first frame is to be transmitted.

In some demonstrative embodiments, the first BI start time field value may be based, for example, on a number of bits of the TBTT corresponding to a number of bits in the BI start time field.

In some demonstrative embodiments, the first BI start time field value may be based, for example, on n/8 lower octets of the TBTT of the BI, during which the first frame is to be transmitted, for example, it the BI start time field has a size of n bits.

In some demonstrative embodiments, the first BI start time field value may be based, for example, on four lower octets of the TBTT of the BI, during which the first frame is to be transmitted, for example, it the BI start time field has a size of 4 octets.

In some demonstrative embodiments, the first BI start time value may be, for example, based on n/8 lower octets of the TBTT and a value, which is within the BI start time field range, e.g., a value of no more than $2^{(n-1)}-1$.

In some demonstrative embodiments, the first BI start time field value may bet set, for example, to indicate the four lower bytes of a TBTT, which may be determined, for example, based on a TBTT the WSE is to be issued, and a value, which is less than $2^{31}-1$, for example if the BI start time field includes 32 bits.

In some demonstrative embodiments, controller 124 may be configured to cause the wireless station implemented by device 102 to switch to a PS mode based on the first BI start time field value.

In some demonstrative embodiments, controller 124 may be configured to cause the wireless station implemented by device 102 to switch to the PS mode, for example, at a TBTT having four lower bytes, which are equal to the BI start time field value.

In some demonstrative embodiments, controller 124 may be configured to cause the wireless station implemented by device 102 to transmit a second frame, during the PS, the second frame including a second WSE, for example, while the wireless station is operating in the PS mode.

In some demonstrative embodiments, the second WSE may include a second BI start time field value, e.g., different from the first BI start time field value.

In some demonstrative embodiments, the second BI start time field value may be configured to extend the duration of the PS mode, e.g., as described below.

In some demonstrative embodiments, controller 124 may be configured to cause the wireless station implemented by device 102 to transmit the second frame including the second WSE having the second BI start time field value, for example, to extend the PS mode longer than a duration of the PS mode indicated by the first BI start time field value In some demonstrative embodiments, controller 124 may be configured to cause the wireless station implemented by device 102 to transmit the second frame including the second WSE having the second BI start time field value, for example, when the wireless station is in the PS mode and is to stay in the PS mode for a period longer than the duration of the PS mode indicated by the first BI start time field value, for example, to extend the PS mode for an additional period, e.g., of up to $2^{(n-1)}-1$.

In some demonstrative embodiments, controller 124 may be configured to cause the wireless station implemented by device 102 to transmit the second frame including the second WSE having the second BI start time field value, for example, when the wireless station is to stay in the PS mode for a period longer than the duration of the PS mode indicated by the first BI start time field value, for example, longer than $2^{31}-1$ microseconds, e.g., if the range of the BI start time field is 32 bits.

In some demonstrative embodiments, controller 124 may be configured to cause the wireless station implemented by device 102 to set the second BI start time field value, e.g., while the wireless station is operating in the PS mode, for example, based on a TBTT of a BI at a start time of a sleep cycle, e.g., as described below.

In some demonstrative embodiments, controller 124 may be configured to cause the wireless station implemented by device 102 to set the second BI start time field value based, for example, on n/8 lower octets of the TBTT of the BI at the start time of the sleep cycle, for example, if the BI start time field includes n bits.

In some demonstrative embodiments, controller 124 may be configured to cause the wireless station implemented by device 102 to set the second BI start time field value based, for example, on four lower octets of the TBTT of the BI at the start time of the sleep cycle, for example, if the BI start time field includes 32 bits.

In some demonstrative embodiments, controller 124 may be configured to cause the wireless station implemented by device 102, e.g., while operating in the PS mode, to set the second BI start time field value, for example, at a start time of a current sleep cycle or any previous sleep cycle.

In some demonstrative embodiments, controller 124 may be configured to cause the wireless station implemented by device 102, e.g., while operating in the PS mode, to set the second BI start time field value, based, for example, on four lower octets of the TBTT of the BI at the start time of a current sleep cycle.

In some demonstrative embodiments, controller 124 may be configured to cause the wireless station implemented by device 102, while operating in the PS mode, to set the second BI start time field value, for example, at a start time of a forthcoming sleep cycle, in which the wireless station implemented by device 102 is still to be in the PS mode.

In some demonstrative embodiments, controller 124 may be configured to cause the wireless station implemented by device 102 to replace and/or update the value of the BI start field, for example, by sending a frame, e.g., the second frame, including the WSE, e.g., the second WSE, which may include the updated BI start field, e.g., the second BI start field value.

In some demonstrative embodiments, updating the value of the BI start field shall happen at a beginning of a sleep cycle.

In some demonstrative embodiments, updating the value of the BI start field, e.g., while operating in the PS mode, may happen one or multiple times, for example, inside half of the range of the BI Start time field from a last updated value of the BI start time.

In some demonstrative embodiments, controller 124 may be configured to cause the wireless station implemented by device 102 to update the value of the BI start field, for example, at a beginning of a sleep cycle.

In some demonstrative embodiments, controller 124 may be configured to cause the wireless station implemented by device 102 to repeat updating the value of the BI start field, while still operating in the PS mode, for example, one or more times, e.g., multiple times, e.g., inside half of the range of BI Start time field from a last update of the BI start time value.

In some demonstrative embodiments, controller 124 may be configured to cause the wireless station implemented by device 102 to perform the functionality of a PCP STA.

In some demonstrative embodiments, controller 124 may be configured to cause the PCP STA to transmit a first beacon frame, e.g., a first DMG beacon frame, including the first WSE, for example, prior to transitioning into a PPS mode.

In some demonstrative embodiments, controller 124 may be configured to cause the PCP STA to transition into the PPS mode, for example, based on the value of the BI start time field in the first WSE, e.g., as described above.

In some demonstrative embodiments, to enter PPS mode, controller 124 may be configured to cause the PCP STA to announce the start of a first PCP Awake BI of a sleep cycle, and the number of successive PCP Awake BIs of the wakeup schedule, for example, through a DMG WSE, e.g., the first WSE described above.

In some demonstrative embodiments, controller 124 may be configured to cause the PCP STA to include the WSE in DMG Beacons and/or in Announce frames.

In some demonstrative embodiments, controller 124 may be configured to cause the PCP STA to transmit, during the PPS mode, a second beacon frame, e.g., a second DMG beacon frame, including the second WSE, for example, if the PCP STA is to stay in the PPS mode, for example, longer than a duration corresponding to half of the range of the BI start time field, e.g., longer than $2^{31}-1$ microseconds, from a last update of the BI start time value.

In some demonstrative embodiments, the first PCP Awake BI of a sleep cycle may start, for example, at an instant specified by the value of the BI Start Time field of the announced DMG Wakeup Schedule element.

In some demonstrative embodiments, the number of successive PCP Awake BIs and PCP doze BIs may be specified, for example, by the Number of Awake BIs field and the sleep cycle field of the DMG Wakeup Schedule element.

In some demonstrative embodiments, in the PPS mode, the PCP STA may transition between Awake BI and Doze BI, e.g., following the Wakeup Schedule element announced by the PCP STA.

In some demonstrative embodiments, controller 124 may be configured to cause the wireless station implemented by device 102 to perform the functionality of a non-PCP/AP STA.

In some demonstrative embodiments, controller 124 may be configured to cause the non-PCP/AP STA to transmit a first frame, e.g., a first DMG Power Save Configuration Request frame, including the first WSE, for example, prior to transitioning into a PS mode.

In some demonstrative embodiments, controller 124 may be configured to cause the non-PCP/AP STA to transition into the PS mode, for example, based on the value of the BI start time field in the first WSE, e.g., as described above.

In some demonstrative embodiments, controller 124 may be configured to cause the non-PCP/AP STA to transmit, during the PS mode, a second frame, e.g., a second DMG Power Save Configuration Request frame, including the second WSE, for example, if the non-PCP/AP STA is to stay in the PS mode, for example, longer than a duration corresponding to half of the range of the BI start time field, e.g., longer than $2^{31}-1$ microseconds, from a last update of the BI start time value.

In some demonstrative embodiments, controller 124 may cause the STA implemented by device 102 to calculate and/or set the BI start time field of a WSE, for example, based on whether or not the STA is in a PS mode or not, e.g., as described below.

In some demonstrative embodiments, controller 124 may cause the STA to set the BI start time field, for example, based on the lower n/8 octets of a TBTT of a current BI and a value, which is less than $2^{(n-1)}-1$ microseconds, for example, when the STA is to transition into a PS mode, e.g., if the BI start time field includes n bits.

In one example, if the STA is transitioning into PS mode, the BI Start Time field is set based on the lower 4 octets of the TBTT of the current beacon interval and a value that is less than $2^{31}-1$ microseconds, e.g., as described above.

In some demonstrative embodiments, controller 124 may cause the STA to set the BI start time field to the lower n/8 octets of a TBTT value of a start of a current or previous sleep cycle, for example, from a last update of the BI start time value, e.g., if the BI start time field includes n bits.

In one example, if the STA is in PS mode and intends to stay in PS mode longer than $2^{31}-1$ microseconds from a last update of the BI start time value, the BI Start Time field is set to the lower 4 octets of the TBTT value of the start of a current or previous sleep cycle.

In some demonstrative embodiments, controller 124 may cause the STA to set the BI start time field, for example, when the STA is in the PS mode, based on n/8 lower octets of the TBTT of the BI at the start time of a current sleep cycle.

In one example, controller 124 may cause the STA to set the BI start time field, for example, when the STA is in the PS mode, based on 4 lower octets of the TBTT of the BI at the start time of a current sleep cycle.

In some demonstrative embodiments, controller 124 may cause the STA to set the BI start time field during a current sleep cycle based on a sum of the lower n/8 octets of a TBTT of a first Awake BI of a following sleep cycle; and a value, which may be an integral multiple of the current sleep cycle multiplied by a Beacon Interval duration, and which may be less than $2^{(n-1)}-1$ microseconds, e.g., if the BI start time field includes n bits. In one example, the TBTT indicated by the BI start time field shall not extend a TBTT of the current BI start time plus $2^{(n-1)}-1$ microseconds.

In one example, if the STA is in PS mode and intends to change its current sleep cycle, e.g., to a new sleep cycle, the BI Start time field of the new sleep cycle is set to be equal to the lower 4 octets of TBTT of a first Awake BI of a following sleep cycle plus a value that is an integral multiple of the current sleep cycle multiplied by Beacon Interval duration and is less than $2^{31}-1$ microseconds. For example, the TBTT indicated by the BI start time field shall not extend a TBTT of the current BI start time plus $2^{31}-1$ microseconds.

In some demonstrative embodiments, controller 124 may cause the STA to set the Sleep Cycle filed in the WSE to indicate a duration of a sleep cycle, for example, in terms of beacon intervals.

In some demonstrative embodiments, the Sleep Cycle field may indicate the sleep cycle duration in beacon intervals, e.g., the sum of awake BIs and doze BIs that make up the sleep cycle.

In some demonstrative embodiments, controller 124 may cause the STA to set the Sleep Cycle filed in the WSE, for example, such that the result of multiplying of value of the Sleep Cycle field by a length of a BI shall be kept shorter, for example, than half of the range of BI Start time field.

For example, in some demonstrative embodiments, controller 124 may cause the STA to keep a product of multiplying the Sleep Cycle field value by the length of the Beacon Interval to be shorter than half of the range of the BI Start time field.

In some demonstrative embodiments, controller 124 may cause the STA to set the Sleep Cycle filed in the WSE to a value, which is a power of two, and/or which is less than a ratio between $(2^{(n-1)}-1)$ and a beacon interval duration, e.g., if the BI start time field includes n bits.

In some demonstrative embodiments, the Sleep Cycle field value can only be a power of two and is less than the result of $(2^{31}-1)$ divided by the beacon interval duration. Other values may be reserved.

In other embodiments, the Sleep Cycle field value may be set according to any other additional or alternative criterion and/or calculation.

In some demonstrative embodiments, controller 124 may cause the STA to set the Number of Awake/Doze BIs field of the WSE to indicate a number of awake BIs, for example, at a beginning of a sleep cycle, e.g., at the beginning of each sleep cycle.

In some demonstrative embodiments, controller 124 may cause the STA to set the Number of Awake/Doze BIs field to a value of zero, for example, to indicate that no Awake BIs are to be included in the sleep cycle.

In some demonstrative embodiments, controller 154 may be configured to cause a wireless station, for example, a wireless station implemented by device 140, to process reception of a received frame including a WSE, for example, which may be generated by another STA, e.g., the WSE originator STA. For example, controller 154 may be configured to cause the wireless station to process reception of the frame transmitted by device 102.

In some demonstrative embodiments, controller 154 may cause the wireless station to perform the functionality of a PCP STA, for example, to process reception of the frame including the WSE, e.g., from a non-PCP/AP STA. For example, the frame may include a DMG Power Save Configuration Request frame, e.g., as described above.

In some demonstrative embodiments, controller 154 may cause the wireless station to perform the functionality of a non-PCP/AP STA, for example, to process reception of the frame including the WSE, e.g., from a PCP STA. For example, the frame may include a DMG beacon frame, e.g., as described above.

In some demonstrative embodiments, the WSE originator STA may include the PCP STA. For example, the WSE may include a WSE generated by the PCP STA, e.g., to indicate a PPS mode of the PCP STA.

In some demonstrative embodiments, the WSE originator STA may be another non-PCP STA. For example, the WSE may include a WSE generated by the other non-PCP/AP STA, and may be announced, for example, by the PCP STA.

In some demonstrative embodiments, controller 154 may cause the wireless station to determine, identify and/or detect a PS mode and/or an active mode of the WSE originator STA, for example, based on the WSE of the WSE originator STA, e.g., as described below.

In some demonstrative embodiments, controller 154 may cause the wireless station to determine, identify and/or detect one or more Awake BIs and/or one or more Doze BIs of the WSE originator STA, for example, based on the received WSE of the WSE originator STA, e.g., as described below.

In some demonstrative embodiments, a STA, e.g., the STA implemented by device 104, that has the WSE of another STA, e.g., the STA implemented by device 102, can identify an Active mode, a PS mode, an Awake BI, and/or a Doze BI of the STA that the WSE belongs to, for example, using parameters of the WSE, and 4 lower bytes of a TBTT of a BI, e.g., a BI during which the WSE is received.

In some demonstrative embodiments, controller 154 may cause the wireless station to determine, identify and/or detect that the STA to which the WSE belongs is in an active mode, for example, if or when:

(BI Start Time−lower 4 octets (TBTT)>0) AND (1<
  (BI Start Time/BI−INT (lower 4 octets (TBTT)/
  BI))<INT ($2^{31}$/BI))

OR (BI Start Time−lower 4 octets (TBTT)<0) AND ABS
  (BI Start Time/BI−INT (lower 4 octets (TBTT)/
  BI))>INT ($2^{31}$/BI)             (1)

In some demonstrative embodiments, controller 154 may cause the wireless station to determine, identify and/or detect that the STA to which the WSE belongs is in a PS mode, for example, if or when:

BI Start Time−lower 4 octets (TBTT)=0

OR (BI Start Time−lower 4 octets (TBTT)>0) AND (BI
  Start Time/BI−INT (lower 4 octets (TBTT)/BI))
  >INT ($2^{31}$/BI))

OR (BI Start Time−lower 4 octets (TBTT)<0) AND
  (1<ABS (BI Start Time/BI−INT (lower 4 octets
  (TBTT)/BI))<INT ($2^{31}$/BI))           (2)

In some demonstrative embodiments, if or when the STA to which the WSE belongs is in a PS mode, the STA may be at a position in a sleep cycle, e.g., as follows:

If (lower 4 octets (TBTT)−BI Start Time)>=0

Position=MOD ((lower 4 octets (TBTT)−BI Start Time)/BI, Sleep Cycle) Else IF (lower 4 octets (TBTT)−BI Start Time)<0

Position=MOD ($2^{32}$+lower 4 octets (TBTT)−BI Start Time)/BI, Sleep Cycle)     (3)

In some demonstrative embodiments, controller 154 may cause the wireless station to determine, identify and/or detect that he STA to which the WSE belongs is in an Awake BI, for example, if or when:

position<=Number of Awake/Doze BIs     (4)

In some demonstrative embodiments, controller 154 may cause the wireless station to determine, identify and/or detect that he STA to which the WSE belongs is in an Doze BI, for example, if or when:

position>Number of Awake/Doze BIs     (5)

Figure 3:
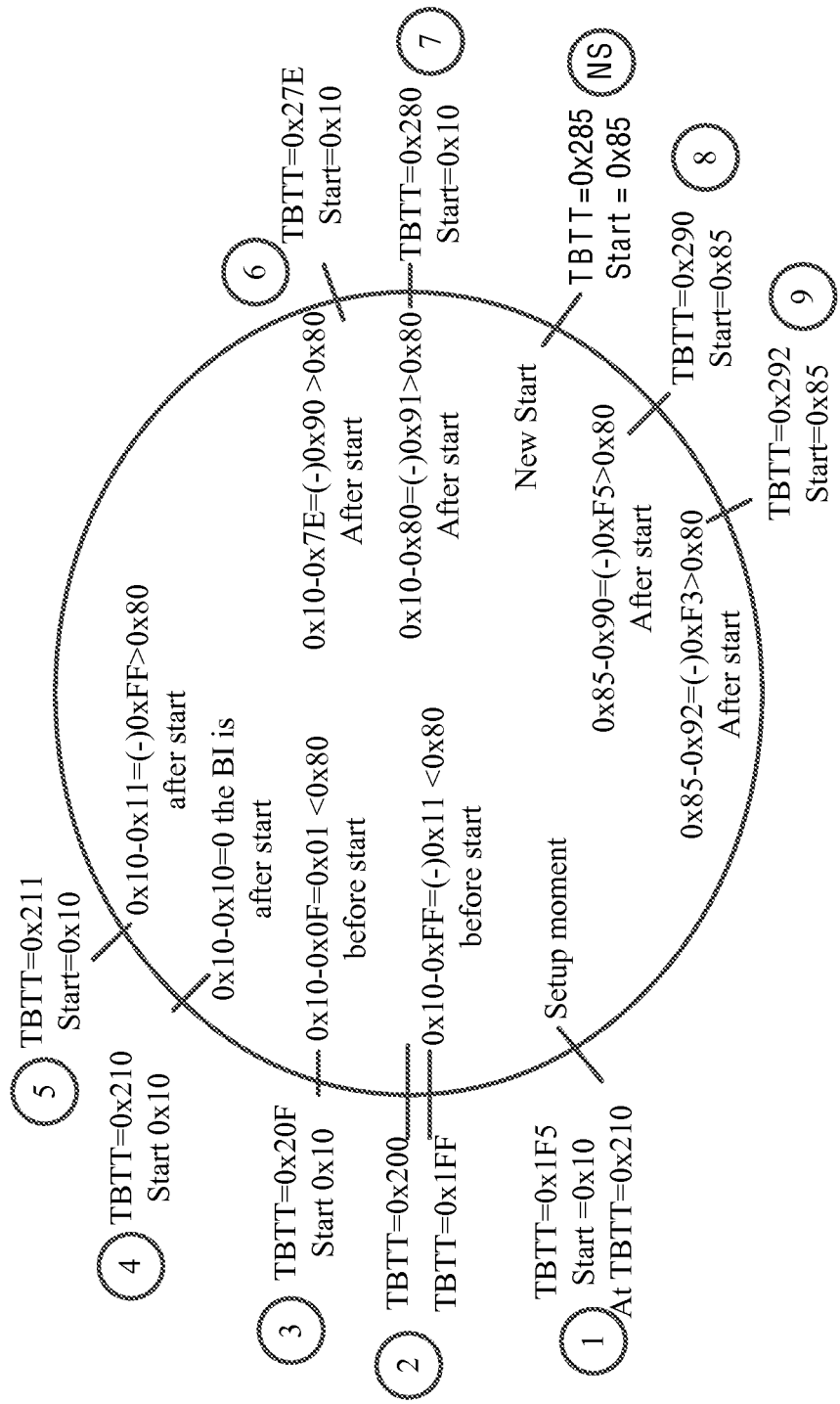
FIG. 3 is a schematic illustration of indications of a power save mode of a wireless station (STA) when a BI Start Time field is updated, in accordance with some demonstrative embodiments.

Reference is made to FIG. 3, which schematically illustrates indications of a PS mode when a BI start time filed field is updated, in accordance with some demonstrative embodiments. For example, one or more of the operations described below with respect to FIG. 3 may be performed by a STA, e.g., a STA implemented by device 102 (FIG. 1) and/or a STA implemented by device 104 (FIG. 1).

In some demonstrative embodiments, as shown in FIG. 3, a STA may insert a WSE in a frame, e.g., at a time point, denoted 1. As shown in FIG. 3, the WSE may include a Beacon Interval Start Time field value set to (0x10) in Hexadecimal form.

In some demonstrative embodiments, as shown in FIG. 3, at subsequent time points, denoted "2", "3", "4", "5", "6", and "7", a difference between the Beacon Interval Start time field value (0x10) in Hexadecimal form, and the low 16 bits of the TBTT may be compared to half of the Beacon Interval Start time range, e.g., (0x80) in Hexadecimal form.

In some demonstrative embodiments, the STA may select to remain in the PS mode, for example, even after a time point, denoted "8".

In some demonstrative embodiments, the STA may be configured to replace and/or update an actual Beacon Interval Start time value of the sleep cycle, for example, during the sleep cycle. In one example, the STA may be configured to replace and/or update an actual Beacon Interval Start time value of the sleep cycle at a time, which is, for example, less than half of the full range of the Beacon Interval Start time field, e.g., (0x80) in Hexadecimal form, plus the actual Beacon Interval Start time of the sleep cycle, e.g., (0x10) in Hexadecimal form. In another example, the STA may be configured to replace and/or update an actual Beacon Interval Start time of the sleep cycle at any other time.

In some demonstrative embodiments, as shown in FIG. 3, the STA may update the value in the Beacon Interval Start Time from (0x10) to a new and/or updated value ("the new beacon interval start time"), and may insert a WSE in a frame, which may be transmitted by the STA at a time point denoted "NS", e.g., during the PS mode of the STA.

In some demonstrative embodiments, as shown in FIG. 3, the STA may allocate the new Beacon Interval Start time of the sleep cycle at the time point NS, e.g., at TBTT=0x285 in Hexadecimal form.

In some demonstrative embodiments, the STA may set the new Beacon Interval Start time value to a value of the TBTT, e.g., the lower 16 bits of the TBTT, at the beacon that is sent with the new Beacon Interval Start time.

For example, as shown in FIG. 3, the STA may set the new Beacon Interval Start time value to the value 0x85 in Hexadecimal form, e.g., which may include the lower 16 bits of the TBTT=0x285 in Hexadecimal form.

In some demonstrative embodiments, as shown in FIG. 3, the difference between the new Beacon Interval Start time field value (0x85) in Hexadecimal from, and the low 16 bits of the TBTT at time points 8 and 9 may correctly indicate that the STA is in the PS mode at points 8 and/or 9. For example, the difference between the new Beacon Interval Start time field value (0x85) in Hexadecimal form, and the low 16 bits of the TBTT at time points 8 and 9 may be equal to or greater than the full range of Beacon Interval Start time field, e.g., (0x80) in Hexadecimal from.

Figure 4:
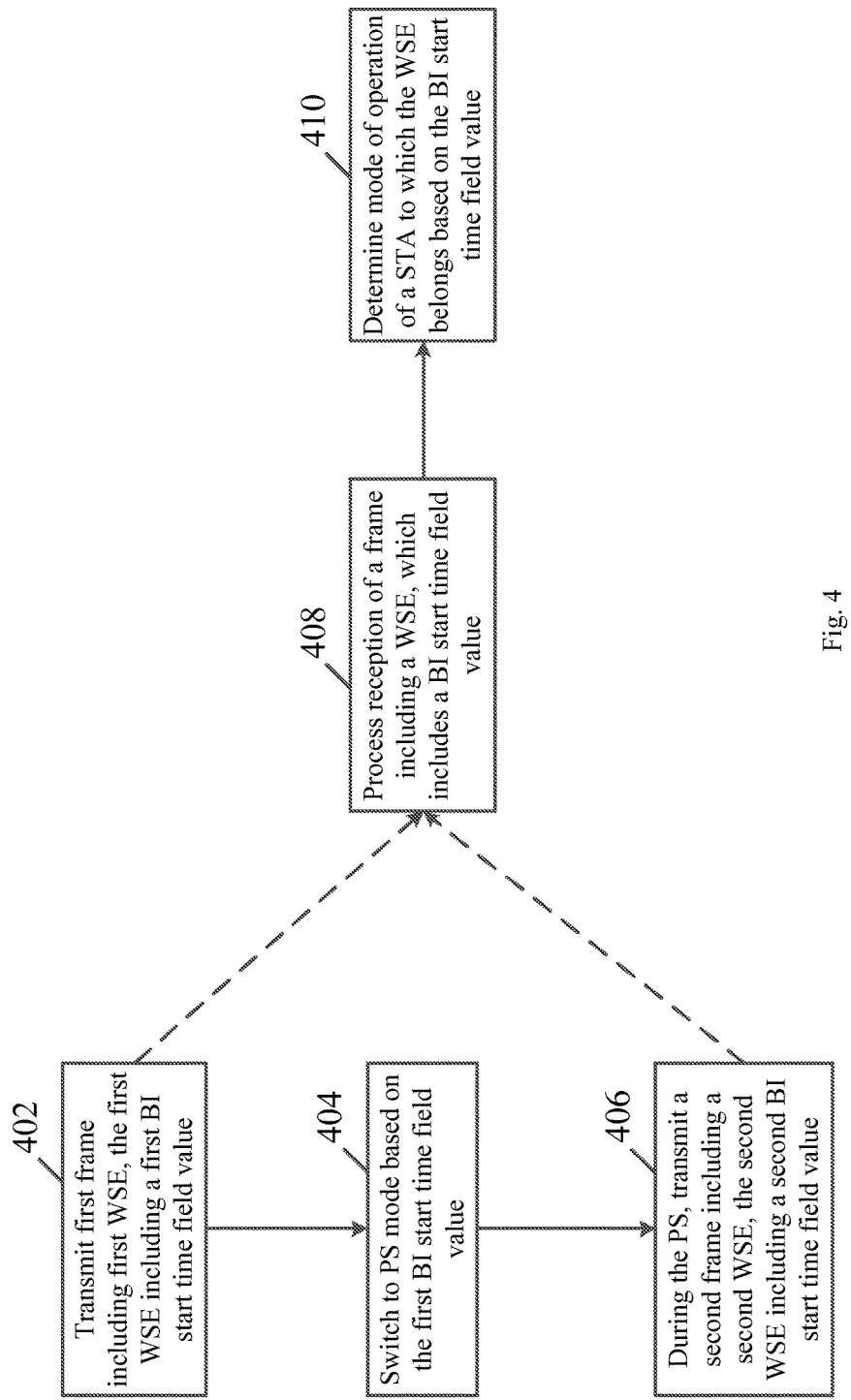
FIG. 4 is a schematic flow-chart illustration of a method of power management in a wireless network, in accordance with some demonstrative embodiments.

Reference is made to FIG. 4, which schematically illustrates a method of power management, in accordance with some demonstrative embodiments. For example, one or more of the operations of the method of FIG. 4 may be performed by one or more elements of a system, e.g., system 100 (FIG. 1), for example, one or more wireless devices, e.g., device 102 (FIG. 1) and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at bock 402, the method may include transmitting a first frame including a first WSE, the first WSE including a first BI start time field value. For example, controller 124 (FIG. 1) may cause radio 114 (FIG. 1) to transmit a first frame including a first WSE, which includes a first BI stat time field value, e.g., as described above.

As indicated at block 404, the method may include switching to a PS mode based on the first BI start time field value. For example, controller 124 (FIG. 1) may cause a STA implemented by device 102 (FIG. 1) to switch to a PS mode based on the first BI start time field value, e.g., as described above.

As indicated at block 406, the method may include, during the PS, transmitting a second frame including a second WSE, the second WSE including a second BI start time field value, e.g., different from the first BI start time field value. For example, controller 124 (FIG. 1) may cause radio 114 (FIG. 1) to transmit a second frame including a second WSE, which includes a second BI stat time field value, for example, during the PS mode, e.g., as described above.

As indicated at block 408, the method may include processing a received frame including a WSE, which includes a BI start time field value. For example, For example, controller 154 (FIG. 1) may control message processor 158 (FIG. 1) to process reception of the first frame including the first WSE and/or the second frame including the second WSE, e.g., as described above.

As indicated at block 410, the method may include determining a mode of operation of a STA to which the received WSE belongs, for example, based on the BI start time field value in the WSE. For example, controller 154 (FIG. 1) may determine whether the STA to which the WSE belongs is in a PS mode, an Active mode, a Dose BI or an Awake BI, for example, based on the BI start time field value in the WSE, e.g., as described above.

Figure 5:
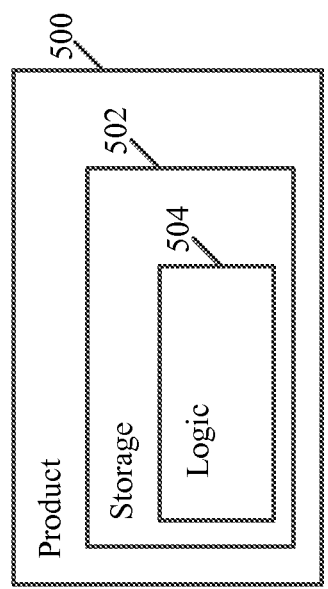
FIG. 5 is a schematic illustration of a product of manufacture, in accordance with some demonstrative embodiments.

Reference is made to FIG. 5, which schematically illustrates a product of manufacture 500, in accordance with some demonstrative embodiments. Product 500 may include a non-transitory machine-readable storage medium 502 to store logic 504, which may be used, for example, to perform at least part of the functionality of devices 102 and/or 140 (FIG. 1), transmitters 118 and/or 148 (FIG. 1), receivers 116 and/or 146 (FIG. 1), controllers 124 and/or 154 (FIG. 1), message processors 128 and/or 158 (FIG. 1) and/or to perform one or more operations of FIGS. 3 and/or 4. The phrase "non-transitory machine-readable medium" is directed to include all computer-readable media, with the sole exception being a transitory propagating signal.

In some demonstrative embodiments, product 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry configured to cause a wireless station to transmit a first frame comprising a first Wakeup Schedule Element (WSE), the first WSE comprising a first beacon interval (BI) start time field value; switch to a Power Save (PS) mode based on the first BI start time field value; and during the PS mode, transmit a second frame comprising a second WSE, the second WSE comprising a second BI start time field value, different from the first BI start time field value.

Example 2 includes the subject matter of Example 1, and optionally, wherein the first BI start time field value is based on a Target Beacon Transmission Time (TBTT) of a BI, during which the first frame is to be transmitted.

Example 3 includes the subject matter of Example 2, and optionally, wherein the first BI start time field value is based on four lower octets of the TBTT of the BI, during which the first frame is to be transmitted.

Example 4 includes the subject matter of Example 3, and optionally, wherein the first BI start time field value is based on the four lower octets of the TBTT and a value, which is less than $2^{31}-1$.

Example 5 includes the subject matter of any one of Examples 1-4, and optionally, wherein the second BI start time field value is based on a Target Beacon Transmission Time (TBTT) of a BI at a start time of a sleep cycle.

Example 6 includes the subject matter of Example 5, and optionally, wherein the second BI start time field value is based on four lower octets of the TBTT of the BI at the start time of the sleep cycle.

Example 7 includes the subject matter of Example 5, and optionally, wherein the second BI start time field value is based on four lower octets of the TBTT of the BI at the start time of a current sleep cycle.

Example 8 includes the subject matter of any one of Examples 1-7, and optionally, wherein the first BI start time field value is within a predefined time range, and the second BI start time field value is to extend the PS mode longer than the predefined time range.

Example 9 includes the subject matter of any one of Examples 1-8, and optionally, wherein the first BI start time field value is within a range of values, which is half of a BI start time field range.

Example 10 includes the subject matter of any one of Examples 1-9, and optionally, wherein the wireless station is a personal basic service set (PBSS) control point (PCP), the PS mode comprising a PCP PS (PPS), the first and second frames comprising first and second respective beacon frames.

Example 11 includes the subject matter of any one of Examples 1-9, and optionally, wherein the wireless station is a non personal basic service set (PBSS) control point (PCP)/non Access Point (AP) (non-PCP/non-AP) station.

Example 12 includes the subject matter of any one of Examples 1-11, and optionally, wherein the wireless station is a Direct Multi-Gigabit (DMG) station.

Example 13 includes the subject matter of any one of Examples 1-12, and optionally, comprising a radio to transmit the first and second frames.

Example 14 includes the subject matter of any one of Examples 1-13, and optionally, comprising a memory, and one or more antennas.

Example 15 includes a method to be performed by a wireless station, the method comprising transmitting a first frame comprising a first Wakeup Schedule Element (WSE), the first WSE comprising a first beacon interval (BI) start time field value; switching to a Power Save (PS) mode based on the first BI start time field value; and during the PS mode, transmitting a second frame comprising a second WSE, the second WSE comprising a second BI start time field value, different from the first BI start time field value.

Example 16 includes the subject matter of Example 15, and optionally, wherein the first BI start time field value is based on a Target Beacon Transmission Time (TBTT) of a BI, during which the first frame is to be transmitted.

Example 17 includes the subject matter of Example 16, and optionally, wherein the first BI start time field value is based on four lower octets of the TBTT of the BI, during which the first frame is to be transmitted.

Example 18 includes the subject matter of Example 17, and optionally, wherein the first BI start time field value is based on the four lower octets of the TBTT and a value, which is less than 231-1.

Example 19 includes the subject matter of any one of Examples 15-18, and optionally, wherein the second BI start time field value is based on a Target Beacon Transmission Time (TBTT) of a BI at a start time of a sleep cycle.

Example 20 includes the subject matter of Example 19, and optionally, wherein the second BI start time field value is based on four lower octets of the TBTT of the BI at the start time of the sleep cycle.

Example 21 includes the subject matter of Example 19, and optionally, wherein the second BI start time field value is based on four lower octets of the TBTT of the BI at the start time of a current sleep cycle.

Example 22 includes the subject matter of any one of Examples 15-21, and optionally, wherein the first BI start time field value is within a predefined time range, and the second BI start time field value is to extend the PS mode longer than the predefined time range.

Example 23 includes the subject matter of any one of Examples 15-22, and optionally, wherein the first BI start time field value is within a range of values, which is half of a BI start time field range.

Example 24 includes the subject matter of any one of Examples 15-23, and optionally, wherein the wireless station is a personal basic service set (PBSS) control point (PCP), the PS mode comprising a PCP PS (PPS), the first and second frames comprising first and second respective beacon frames.

Example 25 includes the subject matter of any one of Examples 15-23, and optionally, wherein the wireless station is a non personal basic service set (PBSS) control point (PCP)/non Access Point (AP) (non-PCP/non-AP) station.

Example 26 includes the subject matter of any one of Examples 15-25, and optionally, wherein the wireless station is a Direct Multi-Gigabit (DMG) station.

Example 27 includes a product comprising one or more tangible computer-readable non-transitory storage media comprising computer-executable instructions operable to, when executed by at least one computer processor, enable the at least one computer processor to implement one or more operations at a wireless station, the operations comprising transmitting a first frame comprising a first Wakeup Schedule Element (WSE), the first WSE comprising a first beacon interval (BI) start time field value; switching to a Power Save (PS) mode based on the first BI start time field value; and during the PS mode, transmitting a second frame comprising a second WSE, the second WSE comprising a second BI start time field value, different from the first BI start time field value.

Example 28 includes the subject matter of Example 27, and optionally, wherein the first BI start time field value is based on a Target Beacon Transmission Time (TBTT) of a BI, during which the first frame is to be transmitted.

Example 29 includes the subject matter of Example 28, and optionally, wherein the first BI start time field value is based on four lower octets of the TBTT of the BI, during which the first frame is to be transmitted.

Example 30 includes the subject matter of Example 29, and optionally, wherein the first BI start time field value is based on the four lower octets of the TBTT and a value, which is less than 231-1.

Example 31 includes the subject matter of any one of Examples 27-30, and optionally, wherein the second BI start time field value is based on a Target Beacon Transmission Time (TBTT) of a BI at a start time of a sleep cycle.

Example 32 includes the subject matter of Example 31, and optionally, wherein the second BI start time field value is based on four lower octets of the TBTT of the BI at the start time of the sleep cycle.

Example 33 includes the subject matter of Example 31, and optionally, wherein the second BI start time field value is based on four lower octets of the TBTT of the BI at the start time of a current sleep cycle.

Example 34 includes the subject matter of any one of Examples 27-33, and optionally, wherein the first BI start time field value is within a predefined time range, and the second BI start time field value is to extend the PS mode longer than the predefined time range.

Example 35 includes the subject matter of any one of Examples 27-34, and optionally, wherein the first BI start time field value is within a range of values, which is half of a BI start time field range.

Example 36 includes the subject matter of any one of Examples 27-35, and optionally, wherein the wireless station is a personal basic service set (PBSS) control point (PCP), the PS mode comprising a PCP PS (PPS), the first and second frames comprising first and second respective beacon frames.

Example 37 includes the subject matter of any one of Examples 27-35, and optionally, wherein the wireless station is a non personal basic service set (PBSS) control point (PCP)/non Access Point (AP) (non-PCP/non-AP) station.

Example 38 includes the subject matter of any one of Examples 27-37, and optionally, wherein the wireless station is a Direct Multi-Gigabit (DMG) station.

Example 39 includes an apparatus of wireless communication by a wireless station, the apparatus comprising means for transmitting a first frame comprising a first Wakeup Schedule Element (WSE), the first WSE comprising a first beacon interval (BI) start time field value; means for switching to a Power Save (PS) mode based on the first BI start time field value; and means for, during the PS mode, transmitting a second frame comprising a second WSE, the second WSE comprising a second BI start time field value, different from the first BI start time field value.

Example 40 includes the subject matter of Example 39, and optionally, wherein the first BI start time field value is based on a Target Beacon Transmission Time (TBTT) of a BI, during which the first frame is to be transmitted.

Example 41 includes the subject matter of Example 40, and optionally, wherein the first BI start time field value is based on four lower octets of the TBTT of the BI, during which the first frame is to be transmitted.

Example 42 includes the subject matter of Example 41, and optionally, wherein the first BI start time field value is based on the four lower octets of the TBTT and a value, which is less than 231-1.

Example 43 includes the subject matter of any one of Examples 39-42, and optionally, wherein the second BI start time field value is based on a Target Beacon Transmission Time (TBTT) of a BI at a start time of a sleep cycle.

Example 44 includes the subject matter of Example 43, and optionally, wherein the second BI start time field value is based on four lower octets of the TBTT of the BI at the start time of the sleep cycle.

Example 45 includes the subject matter of Example 43, and optionally, wherein the second BI start time field value is based on four lower octets of the TBTT of the BI at the start time of a current sleep cycle.

Example 46 includes the subject matter of any one of Examples 39-45, and optionally, wherein the first BI start time field value is within a predefined time range, and the second BI start time field value is to extend the PS mode longer than the predefined time range.

Example 47 includes the subject matter of any one of Examples 39-46, and optionally, wherein the first BI start time field value is within a range of values, which is half of a BI start time field range.

Example 48 includes the subject matter of any one of Examples 39-47, and optionally, wherein the wireless station is a personal basic service set (PBSS) control point (PCP), the PS mode comprising a PCP PS (PPS), the first and second frames comprising first and second respective beacon frames.

Example 49 includes the subject matter of any one of Examples 39-47, and optionally, wherein the wireless station is a non personal basic service set (PBSS) control point (PCP)/non Access Point (AP) (non-PCP/non-AP) station.

Example 50 includes the subject matter of any one of Examples 39-49, and optionally, wherein the wireless station is a Direct Multi-Gigabit (DMG) station.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising circuitry configured to cause a wireless station to:
    transmit a first frame comprising a first Wakeup Schedule Element (WSE), the first WSE comprising a first beacon interval (BI) start time field value, wherein the first BI start time field value is based on four lower octets of a Target Beacon Transmission Time (TBTT) of a BI, during which the first frame is to be transmitted, and on a value which is less than $2^{31} -1$;
    switch to a Power Save (PS) mode based on the first BI start time field value; and
    during the PS mode, transmit a second frame comprising a second WSE, the second WSE comprising a second BI start time field value, different from the first BI start time field value.

2. The apparatus of claim 1, wherein the second BI start time field value is based on a TBTT of a BI at a start time of a sleep cycle.

3. The apparatus of claim 2, wherein the second BI start time field value is based on four lower octets of the TBTT of the BI at the start time of the sleep cycle.

4. The apparatus of claim 2, wherein the second BI start time field value is based on four lower octets of the TBTT of the BI at the start time of a current sleep cycle.

5. The apparatus of claim 1, wherein the first BI start time field value is within a predefined time range, and the second BI start time field value is to extend the PS mode longer than the predefined time range.

6. The apparatus of claim 1, wherein the first BI start time field value is within a range of values, which is half of a BI start time field range.

7. The apparatus of claim 1, wherein the wireless station is a personal basic service set (PBSS) control point (PCP), the PS mode comprising a PCP PS (PPS), the first and second frames comprising first and second respective beacon frames.

8. The apparatus of claim 1, wherein the wireless station is a non personal basic service set (PBSS) control point (PCP)/ non Access Point (AP) (non-PCP/non-AP) station.

9. The apparatus of claim 1, wherein the wireless station is a Directional Multi-Gigabit (DMG) station.

10. The apparatus of claim 1 comprising a radio to transmit said first and second frames.

11. The apparatus of claim 10 comprising a memory to store data processed by the wireless station, and one or more antennas connected to the radio.

12. A method to be performed by a wireless station, the method comprising:
    transmitting a first frame comprising a first Wakeup Schedule Element (WSE), the first WSE comprising a first beacon interval (BI) start time field value, wherein the first BI start time field value is within a range of values, which is half of a BI start time field range;
    switching to a Power Save (PS) mode based on the first BI start time field value; and
    during the PS mode, transmitting a second frame comprising a second WSE, the second WSE comprising a second BI start time field value, different from the first BI start time field value.

13. The method of claim 12, wherein the first BI start time field value is based on a Target Beacon Transmission Time (TBTT) of a BI, during which the first frame is to be transmitted.

14. The method of claim 12, wherein the first BI start time field value is based on a Target Beacon Transmission Time (TBTT) of a BI, during which the first frame is to be transmitted, and on a value which is less than $2^{31} -1$.

15. A product comprising one or more tangible computer-readable non-transitory storage media comprising computer-executable instructions operable to, when executed by at least one processor, enable the at least one processor to cause a wireless station to:
    transmit a first frame comprising a first Wakeup Schedule Element (WSE), the first WSE comprising a first beacon interval (BI) start time field value, wherein the first BI start time field value is based on four lower octets of a Target Beacon Transmission Time (TBTT) of a BI, during which the first frame is to be transmitted, and on a value which is less than $2^{31} -1$;
    switch to a Power Save (PS) mode based on the first BI start time field value; and
    during the PS mode, transmit a second frame comprising a second WSE, the second WSE comprising a second BI start time field value, different from the first BI start time field value.

16. The product of claim 15, wherein the second BI start time field value is based on a TBTT of a BI at a start time of a sleep cycle.

17. The product of claim 16, wherein the second BI start time field value is based on four lower octets of the TBTT of the BI at the start time of the sleep cycle.

18. The product of claim 16, wherein the second BI start time field value is based on four lower octets of the TBTT of the BI at the start time of a current sleep cycle.

19. The product of claim 15, wherein the first BI start time field value is within a predefined time range, and the second BI start time field value is to extend the PS mode longer than the predefined time range.

20. The product of claim 15, wherein the first BI start time field value is within a range of values, which is half of a BI start time field range.

21. The product of claim 15, wherein the wireless station is a Directional Multi-Gigabit (DMG) station.

* * * * *